(12) United States Patent
Sun et al.

(10) Patent No.: US 6,965,633 B2
(45) Date of Patent: Nov. 15, 2005

(54) PILOT SYNCHRONIZATION CHANNEL STRUCTURE FOR CDMA MOBILE COMMUNICATION SYSTEM

(75) Inventors: Ling Sun, Beijing (CN); Changzhu Li, Beijing (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 666 days.

(21) Appl. No.: 09/871,452

(22) Filed: May 31, 2001

(65) Prior Publication Data

US 2001/0048711 A1    Dec. 6, 2001

Related U.S. Application Data

(63) Continuation of application No. PCT/CN00/00219, filed on Aug. 2, 2000.

(30) Foreign Application Priority Data

Aug. 9, 1999  (CN) ............................ 99111205 A

(51) Int. Cl.$^7$ .............................................. H00H 1/00

(52) U.S. Cl. ...................... 375/145; 375/136; 375/142; 375/149; 370/209; 370/342

(58) Field of Search ................................ 375/130, 135, 375/140, 142, 45, 146, 147, 149, 150, 136; 370/209, 342, 509; 380/48

(56) References Cited

U.S. PATENT DOCUMENTS

| 5,828,662 | A |   | 10/1998 | Jalali et al. |
| 5,930,366 | A | * | 7/1999  | Jamal et al. ................. 370/509 |
| 5,991,330 | A |   | 11/1999 | Dahlman et al. |
| 6,504,830 | B1 | * | 1/2003 | Ostberg et al. ............. 370/342 |
| 6,526,091 | B1 | * | 2/2003 | Nystrom et al. ............. 375/142 |
| 6,731,673 | B1 | * | 5/2004 | Kotov et al. ................. 375/145 |

FOREIGN PATENT DOCUMENTS

CN         1227993        9/1999

OTHER PUBLICATIONS

International Search Report from corresponding International Application No. PCT/CN00/00219 dated Oct. 5, 2000.

* cited by examiner

*Primary Examiner*—Shuwang Liu
(74) *Attorney, Agent, or Firm*—Alston & Bird LLP

(57) ABSTRACT

The invention discloses a pilot synchronization channel structure for mobile communication systems. The channel structure includes a pilot channel overlapping a synchronization channel (SCH), defined in the wideband code division multiple access (WCDMA) protocol. Each frame of the pilot channel consists of plural time slots. Each time slot is packed with pre-selected pilot symbols, after spread spectrum and scrambling. The overlap can be defined as search code of one symbol length with pilot signal of m−1 symbols length by intermittent overlap. The overlap can also be defined as search code of one symbol length with pilot signal of m symbols length by continuous overlap. The invention combines organically both CDMA 2000 and WCDMA standards to provide better pilot and synchronization functions.

8 Claims, 1 Drawing Sheet

PILOT SYNCHRONIZATION CHANNEL STRUCTURE FOR CDMA MOBILE COMMUNICATION SYSTEM

CROSS-REFERENCE TO RELATED APPLICATIONS

This application is a continuation application of PCT/CN00/002 19, filed Aug. 2, 2000, which claims the benefit of Chinese Application No. 99111205.9, filed Aug. 9, 1999.

FIELD OF THE INVENTION

The present invention relates generally to channel estimation and pseudo-random sequence acquisition technology in spread spectrum communication systems, and more particularly to a pilot synchronization channel structure applied to a code division multiple access (CDMA) mobile communication system.

BACKGROUND OF THE INVENTION

At present, the standards of third generation (3G) mobile communication systems mainly include the Wideband Code Division Multiple Access (WCDMA) protocol proposed by Europe and the Code Division Multiple Access 2000 (CDMA 2000) protocol proposed by North America. Both of these protocols define and describe in detail radio transmission technology, channel structure and network signaling, etc., used in the systems Among these, the WCDMA provides in down link synchronization channel (SCH), dedicated physical channel (DPCH), common control physical channel (CCPCH), dedicated shared channel (DSCH) and acquisition indicator channel (AICH), etc. as down link physical channel. It also applies dedicated pilot technology, i.e., it applies pilot symbol and data information time multiplexing mode for DPCH, CCPCH and DSCH where pilot is needed.

Under this mode, a mobile station uses pilot symbols to estimate the channel, and the estimation result is used to demodulate the subsequent data. When a mobile station moves quickly, the channel parameters change rapidly and can cause the result of demodulation to be inaccurate. Very complicated estimation methods can be required in order to provide a better estimation result, and such methods are very difficult to implement by hardware.

In addition, as there is no independent pilot channel, a mobile station can only do physical layer measurements for cell selection/reselection, handover and power control etc. on CCPCH. This is sometimes very inconvenient. For example, as CCPCH also carries other information of a base station, pilot symbols are not transferred continuously. When it is necessary to accumulate pilot symbol energy, accumulation control becomes more complicated, and suppressing the inference of noise becomes more time consuming.

Other systems use time division mode of pilot and data so that data included in each channel is decreased and the data rate is lowered accordingly.

In the CDMA 2000 system, all of the base stations are synchronized. In down link, a common continuous pilot channel, i.e. Forward Pilot Channel (F-PICH), is provided. The F-PICH is shared by all traffic channels. It is transmitted in the cell continuously and used for channel estimation, multiple path detection and cell acquisition and handover. All data transmitted on F-PICH are "1" and modulated on a Walsh code, and different base stations have different phases of Walsh code. With the Walsh code, a mobile station achieves initial synchronization with the "most powerful" base station and at the same time, other channels do not transmit the pilot signal anymore.

SUMMARY OF THE INVENTION

Considering the problems associated with WCDMA, discussed above, and considering the harmonization of WCDMA with CDMA 2000, the present invention provides a pilot synchronization channel structure for CDMA mobile communication systems. The invention can provide a more reasonable and more compatible system channel structure. Applying the invention in the WCDMA system will decrease the complexity of the system channel estimation. When the invention is used in a rapidly changing situation, channel estimation accuracy can be increased, physical layer measurement can be conveniently implemented and channel utilization can be increased.

Referring to FIG. 1, the SCH consists of two sub channels, namely, the Primary and Secondary SCH. The WCDMA protocol defines that each frame ($T_{frame}$) length is 10 ms, and the 10 ms radio frames of the Primary and Secondary SCH are divided into 16 slots ($T_{slot}$) each of length 2560 chips, i.e. $T_{frame}=16*T_{slot}$. The Primary SCH consists of the Primary Synchronization Code (PSC) which is denoted Cp. The PSC is an orthogonal Gold code or Walsh code without modulation, and is transmitted once every slot. For all wireless cells, the PSC are all the same.

The secondary SCH consists of repeatedly transmitting a length 16 sequences of unmodulated codes of length 256 chips, the Secondary Synchronization Codes (SSC), transmitted in parallel with the Primary SCH. The SSC is denoted $Cs^{i,k}$ (k=1, 2, ..., 16; i=1, 2, ..., 17) in FIG. 1, each of which is chosen from a set of 17 different orthogonal Gold codes of length 256. Primary synchronization code Cp and secondary synchronization code $Cs^{i,k}$ together are referred to as the search code.

The invention, providing a pilot synchronization channel structure for CDMA mobile communication system, overlaps a pilot channel on the above mentioned Synchronization Channel (SCH), defined in the WCDMA system. The overlap is that the pilot signal included in the pilot channel and the synchronization signal (search code) included in the synchronization channel (SCH) is transmitted with signal overlap in physical layer. Each radio frame of the pilot channel consists of p time slots, and every slot is packed with m pre-selected pilot symbols after spread spectrum and scrambling, wherein the p and m are positive integers.

The m pilot symbols noted above can be as follows: the first pilot symbol can be 0 and all others can be 1 or −1. In this embodiment, the overlap of the synchronization channel (SCH) is that each time slot transmits a search code of one symbol length first, and then transmits a pilot signal of m−1 symbols length, wherein the search code is a general name of the Primary Synchronization Code and the Secondary Synchronization Code.

The m pilot symbols noted above can also all be symbols 1 or −1. In this embodiment, the overlap of the synchronization channel (SCH) is that each time slot transmits two parts of a signal simultaneously. One part is a search code of one symbol length and m−1 symbols of 0. Another part is a pilot signal of m symbols length transmitted continuously, wherein the search code is also a general name of the Primary Synchronization Code and the Secondary Synchronization Code.

The invention, which is a pilot synchronization channel structure for mobile communication system, is based on the sufficient analysis of the advantages and disadvantages of pilot and synchronization channels defined in CDMA 2000 and WCDMA. It combines reasonably the synchronization channel structure of WCDMA with the common pilot channel structure of CDMA 2000 to form a new channel structure.

With the pilot synchronization channel structure of the invention, it is possible to expedite the harmonization of WCDMA and CDMA 2000. The short synchronization code can make the mobile station perform cell search and handover more quickly. In addition, with the common continuous pilot, equipment of fast moving users can better estimate channel parameters and the Bit Error Rate decreases accordingly. At the same time, intelligent antennas and dedicated pilot signals can be used for fast power control for high data rate service.

BRIEF DESCRIPTION OF THE DRAWINGS

Figure 1:
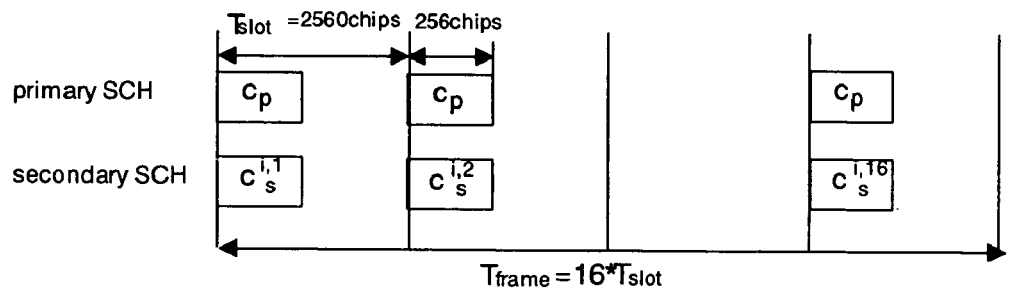
Figure 2:
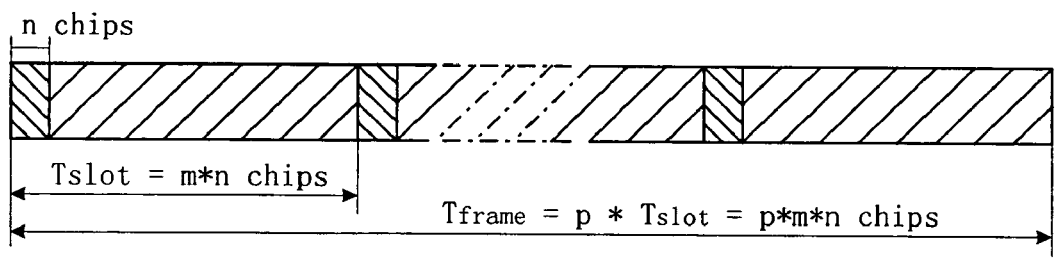
Figure 3:
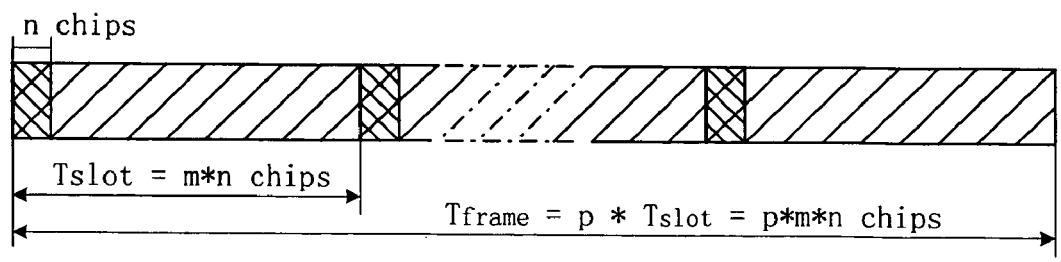

Having thus described the invention in general terms, reference will now be made to the accompanying drawings, which are not necessarily drawn to scale, and wherein:

FIG. 1 illustrates the structure of the SCH radio frame of WCDMA;

FIG. 2 illustrates the signal overlap of a synchronization pilot channel structure; and FIG. 3 illustrates the signal overlap of another synchronization pilot channel structure.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring to FIG. 2 and FIG. 3, schematic diagrams of signal overlap during transmitting for two embodiments of the invention, respectively, are illustrated, wherein a frame consists of p time slots, $T_{frame}=p*T_{slot}$. Each time slot includes m symbols of length n chips. Therefore, it is satisfied that $T_{frame}=p*T_{slot}=p*m*n=p*$ 2560 chips (p, m, n are all positive integers) for each frame length. The signal overlap can be an intermittent overlap of search code in one symbol length and pilot signal in m−1 symbol length, as shown in FIG. 2. It can also be a continuous overlap of search code in one symbol length and pilot signal in m symbol length, as shown in FIG. 3.

The search code is transmitted at the beginning of each time slot, as shown with the left oblique line blocks in the figures. The length of the search code is one symbol length, i.e. n chips. The pilot signal consists of m−1 symbols, as shown with the right oblique line blocks in the figures. In FIG. 2, each time slot consists of one symbol length search code plus m−1 symbols length pilot signal. In FIG. 3, each time slot consists of one symbol length search code overlapping m symbols length pilot signal.

When considering the harmonization with CDMA 2000, the search code and the common pilot signal are transmitted at the same time at the beginning of each time slot, as shown in FIG. 3. Without considering the harmonization with CDMA 2000, in order to decrease the interference of the pilot symbol on the search code, the common pilot symbol is not transmitted when the search code is being transmitted. This means that at the beginning of each time slot the search code is transmitted without transmitting the common pilot symbol at the same time, as shown in FIG. 2.

In implementation, when considering the harmonization with CDMA 2000, the dedicated pilot symbol may not be transmitted any more in traffic channel and broadcast control channel. At this time, the mobile station applies the common pilot signal of the pilot channel to demodulate both traffic data and broadcast data, and applies the search code for the initial cell search. Without considering the harmonization with CDMA 2000, each user applies its own dedicated pilot symbol to demodulate the data in traffic channel, and applies the common pilot symbol, as noted above, to demodulate the data in broadcast control channel, and applies the search code for the initial cell search and handoff.

In practical applications, there are generally two types of mobile terminal. One supports voice service and low data rate service, and the other supports full data rate service. Usually, a rapidly moving subscriber is a low data rate service user, and a high data rate service subscriber is not in fast moving status. Therefore, even without considering the harmonization with CDMA 2000, for a mobile terminal equipment which only supports data service of less than 144 kHz, it is not necessary to transmit the dedicated pilot symbol for its traffic channels. The terminal can use directly the common pilot symbols of the pilot channel of the invention to demodulate data. Only for the mobile terminals which can support data service greater than 144 kHz, traffic channels apply time division dedicated pilot format and are transmitted by intelligent antenna.

A typical pilot synchronization channel structure of the invention is: when the chip rate is 4.096 MHz, a frame has 16 time slots (p=16); when the chip rate is 3.84 MHz, a frame has 15 time slots; the search code length is 256 chips, a time slot length is 2560 chips, and the pilot symbols are all "1".

The pilot channel structure of the invention has the following advantages:

1. By applying the common pilot signal, other channels need not transmit the dedicated pilot symbols. More data can be transmitted during the same periods of time to increase channel utilization and data rate.

2. When pilot symbol is transmitted with continuous mode, the channel estimation is performed in real time, so the signal can be demodulated correctly even in a rapidly changing environment. When pilot symbol is transmitted with intermittent mode, for one time slot, only the signal within one symbol cannot be estimated in real time, comparing with the existing pilot mode, the channel estimation performance is also increased greatly.

3. Continuous pilot signal simplifies the channel estimation and the implementation on hardware becomes much easier.

4. The channel structure of the invention can be used to execute the physical measurement simply and conveniently for cell search, handoff and power control.

5. When pilot symbol is transmitted with continuous mode, it is compatible with CDMA 2000 on the pilot mode.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A pilot synchronization channel structure for code division multiple access communication systems, comprising:
   a synchronization channel (SCH) comprised of a pirmary synchronization channel and a secondary synchronization channel defined in wideband code division multiple access (WCDMA) protocol; and
   a pilot channel overlapping the synchronization channel (SCH);
   wherein the pilot channel comprises data frames comprising p time slots; and wherein each time slot is packed with m pre-selected pilot symbols that have been spread and srambled, wherein m and p are positive integers.

2. The pilot synchronization channel structure according to claim 1, wherein the first symbol of said m pilot symbols is 0, and the other symbols of said m pilot symbols are 1 or −1.

3. The pilot synchronization channel structure according to claim 2, wherein the pilot channel overlaps the synchronization channel (SCH) so that each time slot transmits a search code, comprised of a primary synchronization code and a secondary synchronization code, of one symbol length first, then transmits a pilot signal of m−1 symbols length.

4. The pilot synchronization channel structure according to claim 1, wherein all of said m pilot symbols are 1 or−1.

5. The pilot synchronization channel structure according to claim 4, wherein the pilot channel overlaps the synchronization channel (SCH) so that each time slot transmits two parts of a signal simultaneously, one part of the signal comprising a search code, comprised of a primary synchronization code and a secondary synchronization code, of one symbol length and m−1 symbols "0", respectively, and another part of the signal comprising a pilot signal of m symbols length transmitted continuously.

6. The pilot synchronization channel structure according to claim 1, wherein said pilot symbols have a length of n chips, said time slots have a length that satisfies the formula m*n=2560 chips, and said data frame has a length that satisfies the formula p*m *n=p*2560 chips, wherein n, m and p are all positive integers.

7. The pilot synchronization channel structure according to claim 2, wherein said pilot symbols have a length of n chips, said time slots have a length that satisfies the formula m*n=2560 chips, and said data frame has a length that satisfies the formula p*m *n=p*2560 chips, wherein n, m and p are all positive integers.

8. The pilot synchronization channel structure according to claim 4, wherein said pilot symbols have a length of n chips, said time slots have a length that satisfies the formula m*n=2560 chips, and said data frames have a length that satisfies the formula p* m*n=p*2560 chips, wherein n, m and p are all positive integers.

* * * * *